United States Patent Office 2,855,439
Patented Oct. 7, 1958

2,855,439

SUBSTITUTED α-CHLORO-ISOBUTYRO-PHENONES

Donald G. Kundiger, Manhattan, Kans., and Ernest A. Ikenberry, Ponca City, Okla., assignors to The Dow Chemical Company, Midland, Mich., a corporation of Delaware No Drawing. Application February 2, 1956
Serial No. 562,926

3 Claims. (Cl. 260—592)

This invention is concerned with new compositions of matter and is particularly directed to novel substituted α-chloro-isobutyro-phenones.

The novel compounds are characterized by the formula:

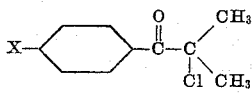

wherein X is selected from the group consisting of chlorine, bromine and methoxy and ethoxy radicals. These substituted α-chloro-isobutyro-phenones are oily liquids substantially insoluble in water and soluble in many organic solvents. They have been found to be relatively stable to oxidation in the presence of moisture and have proved useful as herbicides and fungicides and as intermediates for the preparation of more complex organic compounds.

The compounds of the invention are prepared by reacting α-chloro-isobutyryl chloride with a substituted benzene of the formula:

wherein X has the aforementioned significance, in the presence of anhydrous aluminum chloride and at a reaction temperature below the decomposition temperature of the desired product. In carrying out the reaction, the aluminum chloride is added to an excess of the substituted benzene reactant with cooling and stirring. To the resultant mixture of α-chloro-isobutyryl chloride is added portionwise with stirring at the reaction temperature. The reaction is initiated readily when the reactants are contacted in the above manner and proceeds with the evolution of hydrogen chloride gas. On completion of the reaction, the crude product is poured into a mixture of ice and concentrated hydrochloric acid to decompose aluminum complexes and the desired product is isolated by conventional procedures such as decantation, washing and fractional distillation.

In practice, the substituted benzene reactant and aluminum chloride catalyst are mixed together at room temperature and the addition of the α-chloro-isobutyryl chloride reactant is begun while gradually heating the reaction mixture to initiate reaction. In general, the reaction, as evidenced by the evolution of hydrogen chloride gas, is initiated at from about 20° to about 70° C. Thereafter, the rate of the reaction is maintained at a desirable level by controlling the rate of addition of the α-chloro-isobutyryl chloride and by heating or cooling the reaction mixture within the above temperature limits as required. Higher temperatures are to be avoided in order to minimize the formation of undesired by-products. Usually it is preferred to operate at the lowest temperature at which a practical rate of reaction is obtained.

Any suitable proportions of the reactants may be employed. However, for obtaining good yields of the desired isobutyrophenones, it is preferred to use at least one mole of anhydrous aluminum chloride and at least 4 moles of the substituted benzene reactant to each mole of α-chloro-isobutyryl chloride in the reaction mixture. In such mode of operation, the excess substituted benzene serves as a reaction solvent and the unreacted portion thereof may be recovered for reuse after completion of the reaction.

The products of the reaction may be separated by conventional procedures. In one method of operation, the reaction product is poured into a mixture of crushed ice and a strong mineral acid to decompose aluminum complexes, the resulting mixture separating into an aqueous layer and an oily organic layer. The organic layer is then separated and the aqueous layer extracted with a water-immiscible organic solvent such as ether or benzene. The organic layer and the organic solvent extracts are combined and the solvent is recovered by distillation. The reaction product is then separated and unreacted starting material recovered by fractional distillation under vacuum.

The following examples illustrate the invention, but are not to be construed as limiting the same.

Example 1

133 grams (1 mole) of finely divided, anhydrous aluminum chloride was dispersed in 509 milliliters (5 moles) of chlorobenzene. To the resulting mixture 373 grams of a technical product containing about 212 grams (1.5 moles) of α-chloro-isobutyryl chloride was added portionwise with stirring while maintaining the reaction mixture at 33°–35° C. Upon contact of the reactants, reaction was initiated with the evolution of hydrogen chloride and the reaction mixture was thereafter maintained at 33°–35° C. for a period of 3 hours to complete the reaction. The resulting crude product was poured into a mixture of crushed ice and concentrated hydrochloric acid to decompose aluminum complexes. This mixture separated into an aqueous layer and an oily organic product layer. The latter was separated and the aqueous layer extracted with ether. The organic product and ether extracts were combined, washed successively with dilute aqueous sodium hydroxide solution and water, dried and fractionally distilled to obtain the desired α-chloro-isobutyro-p-chlorophenone product as a clear liquid boiling at 76°–79° C. under 0.5 to 0.7 millimeter pressure and having a refractive index (n/D) of 1.5500 at 20° C.

Example 2

Following the procedure of Example 1, 527 milliliters (5 moles) of bromobenzene was reacted with 373 grams of the technical product containing about 212 grams (1.5 moles) of α-chloro-isobutyryl chloride in the presence of 133 grams (1 mole) of anhydrous aluminum chloride at temperatures of 30° to 37° C. for a period of 4 hours. The crude reaction product was poured into a mixture of crushed ice and concentrated hydrochloric acid and worked up as in Example 1, with the substitution of bromobenzene for ether as the extracting solvent, to obtain an α-chloro-isobutyro-p-bromophenone product as a clear liquid boiling at 95°–97.5° C. under 0.7 millimeters and having a refractive index (n/D) of 1.5695 at 20° C.

Example 3

Following the general procedure of Example 1, 219 grams (2 moles) of anisole was reacted with 56.4 grams (0.4 mole) of α-chloro-isobutyryl chloride in the presence of 67 grams (0.5 mole) of aluminum chloride at a temperature of 65°–70° C. for a period of 1 hour. Thereafter the reaction mixture was cooled to room temperature, allowed to stand for 16 hours and poured into a mixture of crushed ice and concentrated hydrochloric acid. The resulting organic layer was separated and the aqueous layer extracted as in Example 1. The organic layer and extracts were combined, dried and fractionally distilled to recover solvents and unreacted starting material and to separate an α-chloro-isobutyro-p-methoxyphenone product boiling at 113.5°–116.5° C. under 1.4 millimeters pressure.

Example 4

Following the procedure of Example 1, 525 milliliters (4.1 moles) of phenetole was reacted with 96 grams (0.68 mole) of α-chloro-isobutyryl chloride in the presence of 93.5 grams (0.7 mole) of anhydrous aluminum chloride for a period of 3.5 hours at 55°–60° C. The reaction mixture was worked up as in Example 1 to obtain an α-chloro-isobutyro-p-ethoxyphenone product as a clear liquid, boiling at 112° C. under 0.4 millimeter pressure and having a refractive index ($n/D$) of 1.5430 at 20° C.

Example 5

The compounds of the invention are formulated with carriers such as finely divided solids, solvent oils and surface active dispersing agents for the production of herbicidal dusts and sprays. In a representative operation, α-chloro-isobutyro-p-chlorophenone was dissolved in xylene together with a small amount of an alkylphenol-ethylene oxide condensation product and the resulting composition dispersed in water to prepare a spray emulsion. The latter was applied to an area of soil planted to radishes and heavily infested with seed of a foxtail grass species. The application was carried out so as to distribute the α-chloro-isobutyro-p-chlorophenone at the rate of 50 pounds per acre. Excellent control of the grass was obtained with no observable adverse effects on the growth of the radishes.

We claim:

1. Substituted α-chloro-isobutyro-phenones having the formula:

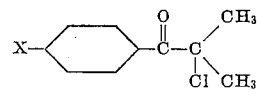

wherein X is selected from the group consisting of chlorine and bromine.

2. α-chloro-isobutyro-p-chlorophenone.
3. α-chloro-isobutyro-p-bromophenone.

References Cited in the file of this patent

Kohler: Amer. Chem. Jour., vol. 41, pp. 421, 428 (1909).

Thomas: Anhyd. Aluminum Chloride in Org. Chem. (1941), pp. 228–230, 302–303, 306–307.